(12) United States Patent
Raa et al.

(10) Patent No.: US 6,958,385 B2
(45) Date of Patent: *Oct. 25, 2005

(54) BIOACTIVE PEPTIDES, USES THEREOF AND PROCESS FOR THE PRODUCTION OF SAME

(75) Inventors: Jan Raa, Oslo (NO); Gunnar Rorstad, Tromso (NO)

(73) Assignee: Biotec Pharmacon ASA, Tromso (NO)

( * ) Notice: Subject to any disclaimer, the term of this patent is extended or adjusted under 35 U.S.C. 154(b) by 481 days.

This patent is subject to a terminal disclaimer.

(21) Appl. No.: 10/122,286

(22) Filed: Apr. 12, 2002

(65) Prior Publication Data

US 2003/0068670 A1 Apr. 10, 2003

Related U.S. Application Data

(63) Continuation-in-part of application No. 09/061,575, filed on Apr. 16, 1998, now Pat. No. 6,376,650.

(51) Int. Cl.$^7$ .......................... C07K 1/00; A61K 38/46; A23K 1/165; A23J 1/00
(52) U.S. Cl. ...................... 530/343; 530/344; 530/857; 514/2; 514/21; 424/94.66; 424/439; 424/442; 424/520; 426/63; 426/641; 426/643; 426/656; 426/657
(58) Field of Search ................................ 530/343, 344, 530/857; 514/2, 21; 424/94.66, 439, 442, 520; 426/63, 641, 643, 656, 657

(56) References Cited

U.S. PATENT DOCUMENTS

| | | | |
|---|---|---|---|
| 5,049,397 A | 9/1991 | Kolbeck | |
| 5,676,986 A | 10/1997 | Choudhury | |
| 5,906,941 A | 5/1999 | Shetty | |
| 6,376,650 B1 | 4/2002 | Raa et al. | |

FOREIGN PATENT DOCUMENTS

| | | |
|---|---|---|
| EP | 0589105 | 3/1994 |
| WO | WO 8103262 | 11/1981 |
| WO | WO 9014016 | 12/1990 |
| WO | WO 9504467 | 2/1995 |
| WO | WO 9521540 | 8/1995 |

OTHER PUBLICATIONS

Gildberg et al., *Isolation of acidic peptide fractions from a fish protein hydrolyzate with strong stimulatory effect on Atlantic salmon (Salmo salar) head kidney leukocytes.* Comp. Biochem. Physiol. B: Biochem. Mol. Biol., 1996 114B(1), 97–101.

Lall, *Fish Silage as Feed for Salmon and Trout*, (no date), Biological Sciences Branch, Department of Fisheries and Oceans, P.O. Box 550, Halifax, Nova Scotia.

Brewer et al., Com. Inst. Food Sci. Technol. J., vol. 17, No. 1, pp. 38–43, 1984.

Gildberg et al., *Chemical Abstract*, 1 page 9551 vol. 125, No. 11, Ref. No. 139962 (Corp. Biochem., Physiol. B., Biochem. Mol. Biol. 1996, 114BC1 (1), 97–101.

Johnson, *Inhibition of Growth by Pro–Inflammatory Cytokines: An Integrated View*, J. Anim. Sci., 1997, vol. 75, 1244–1255.

Heras, H. et al., *Atlantic dogfish silage vs. herring silage in diets for Atlantic salmon (Salmo salar): growth and sensory evaluation of fillets, Aquaculture.*, Feb. 15, 1994, p. 93–106.

Hardy et al., *The Nutritional Properties of Co–Dried Fish Silage in Rainbow Trout (Salmo gairdneri) Dry Diets, Aquaculture,* vol. 38, 1984, p. 35–44.

Espe et al., *Autolysed Fish Silage as a Feed Ingredient for Atlantic Salmon (Salmo salar), Comp. Biochem. Physiol.,* vol. 103A, No. 2, 1992, pp. 369–372.

Asgard et al., *Dogfish offal, ensiled of frozen, as feed for salmonids, Aquaculture,* vol. 49, 1985, p. 289–305.

Raa et al., *Silage production–Theory and practice,* p. 117–130.

Raa et al., *Fish silage: A review,* CRC Critical Reviews in Food Science and Nutrition, Apr. 1982, p. 383–417.

Stone et al., *Nutritional Value of Acid Stabilised Silage and Liquified Fish Protein, J. Sci. Food Agric.,* 1986, vol. 37, p. 797–803.

Wood et al., *Preparation and Evaluation of Diets Containing Fish Sialge, Cooked Fish Preserved with Formic Acid and Low Temperature Dried Fish Meal as Protein Sources for Mirror Carp, Aquaculture,* 1985, vol. 44, p. 27–40.

*Primary Examiner*—Robert A. Wax
*Assistant Examiner*—Abdel A. Mohamed
(74) *Attorney, Agent, or Firm*—Ladas & Parry LLP

(57) ABSTRACT

Novel bioactive peptide compositions and process for producing the same and the use of such compositions for enhancing the growth of warm blooded animals and fish is disclosed.

10 Claims, No Drawings

BIOACTIVE PEPTIDES, USES THEREOF AND PROCESS FOR THE PRODUCTION OF SAME

FIELD OF THE INVENTION

This invention relates to novel bioactive peptide compositions which enhance the growth of animals, a process for the preparation of same and the use of such compositions for enhancing the growth of warm blooded animals and fish.

BACKGROUND OF THE INVENTION

It is well known that porcine and bovine plasma protein can be used in feed formulations for warm blooded animals to improve health, growth and general performance. However, the need for a replacement for such plasma protein is of great importance. The cost of plasma protein continues to increase as foreign and domestic demand increases. In addition, inadequate supply of plasma protein is a frequent problem. Also, due to concern of contamination of host animals through the feeding of plasma protein there is becoming a further need for a non-plasma product which can be utilized in those formulations where plasma protein is either not available or its use is barred. In addition, it is well known that protein hydrolyzates prepared by reaction of selected protein materials with at least one proteolytic enzyme can also be used in feed formulations. Such compounds are generally in such amounts as to maximize its content in the feed formulation without having a negative effect on the host. Such hydrolyzates provided a replacement for fish meal as a protein source and thus while providing nutritional values provided no other benefit in the growth of the host.

Thus there is presently experienced a need for a suitable replacement for plasma as an ingredient of feed formulations as well as the need to achieve growth enhancement for host animals.

SUMMARY OF THE INVENTION

The aforementioned need is met by the present invention by providing a bioactive peptide composition which not only provides an alternative to plasma products but also serves to enhance the growth of both animals and fish.

According to the present invention a bioactive peptide composition is produced by the enzymatic hydrolysis of a protein using the proteolytic enzyme derived from the stomachs of fish, preferably fish found in cold water oceans. Fish inhabiting warm water may also be utilized, however fish inhabiting cold water are preferred. By definition, a cold water fish inhabits cold water ocean environments as opposed to fish that inhabit warm waters. Cold water fish may inhabit the North Atlantic Ocean, Bering Sea, Arctic Ocean, etc. Representative specimens of fish which inhabit cold water and can be utilized to produce proteolytic enzymes in the present invention include cod, salmon, herring, trout, etc. This list is not meant to be limitative.

The present invention is based upon the discovery that the peptide product obtained through enzymatic hydrolysis of a protein source with the pepsin enzyme derived from the stomach of cold water fish can be used as a substitute for plasma protein in achieving growth enhancement of warm blooded animals.

In a first aspect of the present invention there is provided novel animal feed compositions which enhance growth.

In addition, the present invention is also based on the further discovery that such peptide products can be used at low levels to enhance the growth of fish.

Accordingly, in one aspect of the present invention there is provided a novel peptide product which is useful for enhancing the growth of warm blooded animals and fish.

In another aspect of this invention there is provided a process for the production of growth enhancing peptides from a protein source.

In another aspect of this invention there is provided a novel process for enhancing the growth of warm blooded animals and fish.

Other aspects, objects and the several advantages of this invention will be apparent from the foregoing disclosure and appended claims.

The term bioactive peptide compositions as used herein is intended to define a composition consisting essentially of a mixture of peptides with aromatic amino acids in N-terminal position, produced by hydrolysis of a protein source at a pH of 2–6 with pepsins from fish as the hydrolytic enzyme.

The bioactive peptide product of this invention is prepared by a process consisting of the steps of:

a) hydrolyzing a selected protein material, dispersed in an aqueous medium, together with pepsin from cold water fish at a controlled temperature and acidic pH;

b) removing lipids and solids from the pepsin treated acidized protein source; and thereafter c) recovering the resulting bioactive peptide.

The process may employ protein material from any of a great variety of sources including meats, fish and plants. Protein material from fish is particularly preferred for use in the process of this invention.

The process of this invention is particularly adapted to effecting protein hydrolysis in an acidic medium of controlled pH to produce a bioactive peptide composition suitable for use in the enhancement of growth of host animals. Protein material is prepared for treatment by grinding, comminution, or other means to provide a suitable particle size for slurring with acid. The aqueous slurry is heated with agitation at a combination of temperature and time such that the initial reaction velocity of hydrolysis is maximized.

The enzyme employed in the process of this invention is the proteolytic pepsin enzyme derived from the stomach of cold water fish. Preferably, the fish are selected from fish inhabiting water at temperatures ranging from about 0 to about 15° C. More preferably, the fish are selected from the group consisting of cod, salmon, herring, trout, etc. In one presently preferred embodiment of this invention the enzyme is obtained by a process which comprises homogenizing the salmon stomach in the presence of enough formic acid to lower the pH to 4 and then heating for a period of time whereby the homogenate becomes a liquid slurry due to the digestion of the tissues by the enzymes present in the stomach and thereafter recovering from the aqueous phase following removal of sludge and oils following concentration and drying the desired pepsin enzyme.

In carrying out the process, the homogenate of the cold water fish stomach can also be employed as the enzyme source. Thus following the homogenizing of the cold water fish stomach in the presence of acid and the digestion of the tissues thereof by the enzymes present therein, the resulting liquid slurry which is enzyme rich can be employed directly into the process of the present invention as the enzyme source for the production of bioactive peptides.

In the production of the bioactive peptide composition of the invention, a suitable protein source is treated at a pH in the range of about 2–6, preferably at a pH of 4, with the pepsin enzyme derived from the stomachs of cold water fish for a time to effect hydrolysis of the protein source so as to form a mixture of peptides having aromatic amino acids in N-terminal positions which following heating and thereafter removal of oils and sludge provided a liquid composition consisting essentially of bioactive peptides and deactivated cod pepsin.

The hydrolysis step is conducted in a continuous stirred-tank reactor employing an enzyme to protein substrate ratio selected to obtain the desired level of conversion within a time period of 24 to 100 hours.

Generally the enzyme is added in amounts in the range of 0.5 to 5 g per 1000 kg of protein.

Acid employed in the hydrolysis process in an amount to provide normally 3% volume by volume.

Following the removal of oils and undissolved solids from the partially hydrolyzed aqueous protein material dispersion, the recovered protein hydrolyzate fraction may be concentrated, as by reverse osmosis or thermal evaporation and dried, as by freeze drying or spray drying, and sent to product storage for subsequent packaging and distribution.

Pepsin enzyme suitable for use in one embodiment of the present invention is obtained by hydrolysis of Atlantic cod fish stomachs at a pH in the range of 2–6. Following hydrolysis, the resulting hydrolyzate is subjected to lipid and solids removal followed by ultrafiltration of the resulting liquid peptide pepsin mixture to effect recovery of the pepsin enzyme therefrom.

The Atlantic cod pepsin which is used in the process of this invention is a proteolytic enzyme prepared from Atlantic cod (*Gadus morhua*) stomach by autolysis. The enzyme has a specific activity of 100–200 Anson Units expressed as $\mu$ mol TCA-soluble tyrosine released from hemoglobin per hour at pH 3 and 25° C.

The salmon pepsin used in the process of the present invention is a proteolytic enzyme prepared from Norwegian salmon (*Salmo salar*) stomachs by autolysis. The enzyme has a specific activity of 200 Anson units expressed as micromol TCA-soluble tyrosine released from hemoglobin per hour at pH 3 and 25° C.

Other pepsin sources are stomachs of herring, trout, cod and salmon.

The compositions produced by the process of this invention have been found to possess significantly distinctive properties. Such compositions are bioactive peptides which are capable of enhancing growth when included in feed compositions for host animals.

Accordingly, the bioactive peptides of this invention are most appropriate for providing a process for the enhancement of growth of an animal by feeding such animal with an amount of such bioactive peptide to effect growth enhancement of the host animal. In general such growth enhancement is achieved when the bioactive peptide is introduced into the host animal in an amount in the range of 0.1 to 5 g/kg body weight per day.

Feed formulations using the active peptide compositions of this invention will be added to conventional feed ingredients for the intended host animal an amount of bioactive peptide which is sufficient to achieve growth enhancement activity.

Generally such amounts will be in the range of about 0.1 to about 5 weight percent of the total feed, preferably from about 1 to 2%.

Enzyme hydrolysis of the protein source is normally carried out at a temperature in the range of about 2 to about 6. Suitable pH is achieved by use of either a mineral or organic acid or salts thereof which is added prior to addition of the pepsin. The amount of acid employed is that which will provide the desired pH level.

In one presently preferred embodiment of the invention there is employed a lower carboxylic acid namely formic acid.

Protein source starting minerals suitable for the process of the present invention are:

1. fish wastes including whole trash fish, fish left after filleting, fish solubles, fish viscera and any other materials which are by-products of the fishing industry and processing 2. pork skins and tissues 3. beef tissue 4. soy bean proteins or other seed proteins 5. milk proteins The following examples will further illustrate the process and products of the invention.

EXAMPLE I

Enzyme Preparation

Fish stomachs of Atlantic cod, collected from processing plants, are homogenized in the presence of enough formic acid to lower the pH of the homogenate to 4. The homogenate is then heated to 27° C. and held at this temperature for 48 hours. During this period the homogenate becomes a liquid slurry due to digestion of the tissues by the enzymes present in the stomachs. The liquid slurry is then stored in a tank wherein a sludge gradually deposits at the bottom and oil floats to the surface. The aqueous phase between the sludge and the oil layer is then concentrated by ultrafiltration (cut off 10,000 mw) and spray dried at a temperature below the inactivation temperature for the pepsin enzyme (65° C.). The resulting dried and yellow powder contains 100–200 Anson units of protease activity as measured by standard assays for pepsin activity, e.g., $\mu$ mol tyrosine released from hemoglobin per hour at pH 3 and 25° C.

EXAMPLE II

Production of Liquid Bioactive Peptides 1000 kg of by-product from fish processing, e.g. residual meat on back bones, skins, guts, heads, were homogenized in and industrial meat grinder and 30 liters of 85% formic acid added when the homogenate was pumped into a storage tank with stirring equipment.

To the resulting acidized homogenate was added 1 kg of cod stomach enzymes which was obtained in accordance with the protocol of Example 1. The resulting mixture was then maintained at 30° C. for a period of about 5 days to achieve enzymatic degradation of the acidized by-products.

Thereafter, the resulting digest was heated to a temperature of 80° C. to inactivate the added enzyme and to permit oil which was present in the raw materials to float to the surface for removal. After removal of oil by centrifugation in an industrial centrifuge and removal of undissolved bones by screening there was obtained 850–950 liters of an aqueous slurry which was then concentrated by evaporation to 40% dry weight and a final volume of 250–350 liters.

The resulting concentrated product containing 20% by weight of non-digested protein and 70 weight percent of peptide and 10% minerals is designated liquid crude peptide product or "LCP".

EXAMPLE III

Production of Dried Bioactive Peptide 100 liters of the liquid crude peptide product of Example II was dried by spray drying in a NIRO spray dryer at an air out temperature of 80° C., to provide 40 kg of dried crude peptide product "DCP" containing undigested protein, peptides and amino acids.

EXAMPLE IV

Production of Refined Peptides "RBP"

400 liters of LCP produced as described in Example II was subjected to conventional particle filtration using a bag filtration unit, to provide about 250 liters of a solution free of particles bigger than 40μ. Thereafter the resulting filtrate was subjected to ultrafiltration in an industrial hollow fiber cartridge (Amicon) filtration unit with a cut off of 10,000 mw to provide 200 liters of a permeate containing peptides with mw lower than 10,000. The resulting Refined Bioactive Peptide "RBP" can be used in the liquid form. However, 200 liters of RBP was dried by spray drying in a NIRO dryer at 85° C. (air out) to provide 80 kg of RBP in dry form.

EXAMPLE V

Preparation of Feed Compositions

Using dried refined peptide product as produced in Example IV, a series of test feed compositions were prepared using a standard diet formulation having the peptide content as noted in the following table. For performance evaluation a further series of feed compositions was prepared in the same manner with porcine plasma protein.

| Composition No. | 1 | 2 | 3 | 4 | 5 | 6 | 7 |
|---|---|---|---|---|---|---|---|
| Feeding Period 0–13 days | | | | | | | |
| Plasma protein % | 0 | 4 | 3 | 2 | 1 | 0 | 0 |
| Refined peptide % | 0 | 0 | 1 | 2 | 3 | 4 | 2 |
| Feeding period 13–33 days | | | | | | | |
| Plasma protein % | 0 | 0 | 0 | 0 | 0 | 0 | 0 |
| Refined peptide % | 0 | 0 | 0 | 0 | 0 | 2 | 1 |

EXAMPLE VI

The Effect of RBP and Porcine Plasma Protein

To determine the effect of peptide (RBP) and porcine plasma on growth performance of starter pigs a series of treatments using the formulations of Example V were carried out with 7 pens of 22 individual starter pigs.

The results of the feeding treatments are shown in the following table:

| Treatment composition | 1 | 2 | 3 | 4 | 5 | 6 | 7 |
|---|---|---|---|---|---|---|---|
| Weight (kg) | | | | | | | |
| Initial | 5.91 | 5.90 | 5.91 | 5.91 | 5.91 | 5.91 | 5.91 |
| Day 13 | 7.58 | 8.18 | 8.53 | 8.29 | 9.17 | 8.94 | 8.23 |
| Day 33 | 16.24 | 16.24 | 17.04 | 16.85 | 17.94 | 16.49 | 17.8 |
| Weight Gain (kg) | | | | | | | |
| 0–13 days | 1.67 | 2.28 | 2.62 | 2.37 | 3.26 | 3.03 | 2.32 |
| 0–33 days | 10.33 | 10.34 | 11.13 | 10.94 | 12.03 | 10.58 | 11.89 |
| Weight Gain (%) | | | | | | | |
| 0–13 days | 23 | 38 | 44 | 40 | 55 | 51 | 39 |
| 0–33 days | 175 | 175 | 188 | 185 | 204 | 179 | 201 |
| Protein consumed/ Weight Gain | 0.32 | 0.27 | 0.27 | 0.29 | 0.26 | 0.26 | 0.27 |

The above results show that use of the bioactive peptide of the present invention has a marked effect on the growth of young pigs and that this product can replace plasma proteins in starter diets. At a level of 2% in the starter diets the bioactive peptide (RBP) causes the same enhancement of growth as 4% porcine plasma protein during the first 13 days after weaning.

Unlike plasma protein, the bioactive peptide of the present invention results in enhanced growth throughout the entire growth period from weaning of the pigs and the following 33 days.

EXAMPLE VII

Preparation of Fish Feed Compositions

A composition for use as a feed for salmon was prepared by admixing the following ingredients:

| Ingredient | % of dry weight |
|---|---|
| Fish Meal (low temperature dried) | 44.0 |
| Fish Meal (normal quality) | 19.0 |
| Fish Oil | 20.0 |
| Wheat Meal | 14.0 |
| Potato Starch | 2.0 |
| Vitamin C | 0.1 |
| Premix (minerals and vitamins) | 1.0 |
| Carrophyll pink (astaxanthin) | 0.1 |

-continued

| | % of dry weight |
|---|---|
| Chemical composition | |
| Dry matter 96% | |
| Protein 52% | |
| Lipid 21% | |
| Minerals 10% | |

For demonstration of the effectiveness of bioactive peptide in the salmon feed, a composition was prepared wherein 5% of the fish meal was replaced by 5% of dried bioactive crude peptide (DCP).

EXAMPLE VIII

Effect of DCP on Salmon Growth

Salmon (*Salmo salar*) at an average individual weight of 600 grams were separated in two net cages in the sea with 100 fish in each cage. One group was fed the standard salmon feed of Example VII and the other group the same feed containing 5% DCP.

After feeding for 6 months, the salmon fed the standard salmon feed had an average weight of 2.280 kg whereas the salmon fed the 5% DCP diet had an average weight of 2.630 kg. The growth in the reference group during this feeding period was from an average individual weight of 600 g to 2,280 g, or 1,680 g whereas the DCP containing group grew from 600 g to 2,630 g, or 2,030 g.

Comparison of the growth of the two groups indicates that using the product of the present invention there was achieved a 12% growth over those fishes that did not receive the bioactive peptide (DCP).

EXAMPLE IX

Enzyme Preparation from Salmon

Farmed salmon are gutted and all intestinal tissues, consisting of stomach, intestine, gall bladders, liver, milt, roe and residual blood, are removed. The gut tissues are homogenized in a sufficient amount of formic acid to lower the pH to 4, then heated to 30° C. and held at this temperature for 72 hours. At these conditions, the proteolytic enzymes present in the tissues are inactive or permanently inactivated except the pepsin present in the stomachs of the salmon. In the homogenate, the endogenous pepsin associated with the salmon stomach acts on the various tissues in the homogenate in the same way as if the pepsin were first separated from the stomach and then added back to the same tissues as described in Example 1. At these conditions, bioactive peptides are formed by enzymatic degradation of proteins present in the homogenate of the salmon guts. After 72 hours the homogenate held at 30° C. and at a pH of 4 becomes a liquid slurry, from which the lipid/oil is removed by centrifugation after heating to 90° C. The resulting aqueous sludge is then concentrated by evaporation to 50 percent dry matter.

EXAMPLE X

Preparation of Feed Composition

The 50 percent dry weight concentrate of pepsin digested salmon guts is initially mixed with dry fish meal or shrimp meal to facilitate drying in a conventional fish meal dryer. The dried powder, containing bioactive peptides is then used as an ingredient in feed for pigs.

EXAMPLE XI

Effect of the Salmon Pepsin-Derived Peptide and Porcine Plasma

To determine the effect of the peptide derived from salmon and porcine plasma on growth performance of starter pigs, a series of treatments using the formulations of Example X were carried out in seven pens of 280 weaned piglets. The piglets were weaned at 21 days of age with a body weight of 5.8 kg. There were two treatments with seven replicates for treatments and ten piglets per pen. The trial took 21 days. Commercial piglet weaner feed was used. The piglets had ad libitum access to the feed and water in each pen. The results are as follows:

Treatment 1: Commercial diet (APC 900) plus 5.7% porcine plasma

Treatment 2: Commercial diet (APC 900) plus 3% PeptiGard, the product of the present invention (3% pepsin digested salmon gut)

Results are shown in the following table:

| | Treatment 1 | Treatment 2 |
|---|---|---|
| Start weight (kg) | 6.380 | 6.380 |
| Total feed intake (kg) | 7.016 | 7.458 |
| FCR | 1.149 | 1.146 |
| Total weight gain (kg) | 6.143 | 6.512 |

The treatment including the product of the present invention, PeptiGard (3%) provided better results than the use of the commercial diet plus 5.7% porcine plasma.

EXAMPLE XII

Efficacy of Salmon Pepsin-Derived Peptide as a Replacement for Plasma Protein in Weanling Pig Diets Plasma protein has been used in weanling pig diets for many years. The beneficial effects of plasma protein include increased feed intake and rate of gain. These beneficial effects are mediated through immunoglobulins present in plasma protein. Plasma protein is expensive and some countries have recently prohibited feeding mammalian protein (e.g., meat and bone meal) to other animals. The objective of this experiment is to compare the effect of graded levels of replacement plasma protein with the salmon pepsin-derived peptide of the present invention in nursery diets on pen average daily weight gain, feed disappearance and feed conversion efficiency of weanling pigs.

The control plasma protein diet is produced from fresh blood, which is collected from meat processing facilities. Upon collection, the immediate addition of an anticoagulant prevents blood from clotting. Cold blood is passed through a centrifuge to separate cells from plasma. The liquid plasma is regenerated until it is spray dried. The resulting product is a free-flowing powder containing 78% protein. The plasma protein is sold under the commercial trade name AP 920 by American Proteins Corporation.

Protocol 540 female and castrated male pigs were used. The pigs originated from two farrowing groups weaned at approximately 21 days of age. Weak or unhealthy animals were excluded from the study. The experiment comprised six treatments for 15 pigs per pen with six pens and two phases. Phase I: 0 to 14 days; Phase II: 14 to 28 days.

Six dietary treatment regimens were imposed as shown in Table 1. During Phase I (0 to 14 days) and Phase II (14 to 28 days) periods:

Treatment 1, Diet AA, Diet GG→Control; no plasma protein, no PeptiGard®
Treatment 2, Diet BB, Diet HH→4/2% plasma protein, no PeptiGard®
Treatment 3, Diet CC, Diet II→4/0% plasma protein, no PeptiGard®
Treatment 4, Diet DD, Diet JJ→2/1% plasma protein, 2/1% PeptiGard®
Treatment 5, Diet EE, Diet KK→no plasma protein, 4/0% PeptiGard®
Treatment 6, Diet FF, Diet LL→no plasma protein, 4/2% PeptiGard®

The diets are described in the following tables:

| | Phase I Basal Diet | | | |
|---|---|---|---|---|
| Ingredients | AA | BB, CC | DD | EE, FF |
| Corn, Flake | 6.000 | 6.000 | 6.000 | 6.000 |
| Wheat Flour | 12.300 | 12.300 | 12.300 | 12.300 |
| Extruded Soybean | 12.500 | 12.500 | 12.500 | 12.500 |
| Bakery & Cookie Powder | 7.000 | 7.000 | 7.000 | 7.000 |
| Dextrin | 1.000 | 1.000 | 1.000 | 1.000 |
| Soybean Protein Concentrate | 4.000 | — | — | — |
| Plasma Protein | — | 4.000 | 2.000 | — |
| PeptiGard ® | — | — | 2.000 | 4.000 |
| Wheat Gluten | 1.500 | 1.500 | 1.500 | 1.500 |
| Fish Meal | 4.000 | 4.000 | 4.000 | 4.000 |
| Skim Milk | 22.400 | 22.400 | 22.400 | 22.400 |
| Whey | 10.000 | 10.000 | 10.000 | 10.000 |
| Animal Fat | 3.500 | 3.500 | 3.500 | 3.500 |
| Palm Fat | 1.000 | 1.000 | 1.000 | 1.000 |
| Yeast, Bread | 0.020 | 0.020 | 0.020 | 0.020 |
| Limestone | 0.110 | 0.110 | 0.110 | 0.110 |
| Phos. Calcium | 0.400 | 0.400 | 0.400 | 0.400 |
| Sucrose | 7.000 | 7.000 | 7.000 | 7.000 |
| Glucose | 2.000 | 2.000 | 2.000 | 2.000 |
| Lactose | 1.000 | 1.000 | 1.000 | 1.000 |
| Fructose | 2.000 | 2.000 | 2.000 | 2.000 |
| Lysine-HCl | 0.260 | 0.260 | 0.260 | 0.260 |
| L-Tryptophane | 0.030 | 0.030 | 0.030 | 0.030 |
| Threonine | 0.080 | 0.080 | 0.080 | 0.080 |
| Chinese Herb Mix | 0.200 | 0.200 | 0.200 | 0.200 |
| *Bacillus cereus toyoi* | 0.100 | 0.100 | 0.100 | 0.100 |
| Milk Flavor | 0.100 | 0.100 | 0.100 | 0.100 |
| Base blend + Premix | 1.500 | 1.500 | 1.500 | 1.500 |
| Total | 100.000 | 100.000 | 100.000 | 100.000 |

Calculated Nutritional Spec.

| | | | |
|---|---|---|---|
| Protein (%) | 22.817 | Lysine (%) | 1.648 |
| Fat (%) | 8.791 | Methionine (%) | 0.479 |
| M.E. (Kcal/Kg) | 3388.300 | TSAA (%) | 0.866 |
| Calcium (%) | 0.793 | Threonine (%) | 1.013 |
| Phosphorous (%) | 0.702 | Tryptophane (%) | 0.305 |

| | Phase II Basal Diet | | | |
|---|---|---|---|---|
| Ingredients | GG, II, KK | HH | JJ | LL |
| Corn | 59.300 | 59.300 | 59.300 | 59.300 |
| Extruded Soybean | 2.500 | 2.500 | 2.500 | 2.500 |
| Soybean Meal | 19.200 | 19.200 | 19.200 | 19.200 |
| Cookie Powder | 7.000 | 7.000 | 7.000 | 7.000 |
| Fish Meal | 7.700 | 5.700 | 5.700 | 5.700 |
| Plasma Protein | — | 2.000 | 1.000 | — |
| PeptiGard ® | — | — | 1.000 | 2.000 |
| Skim Milk | 1.400 | 1.400 | 1.400 | 1.400 |
| Animal Fat | 1.500 | 1.500 | 1.500 | 1.500 |
| Yeast | 0.005 | 0.005 | 0.005 | 0.005 |
| Salt | 0.050 | 0.050 | 0.050 | 0.050 |
| Limestone | 0.650 | 0.650 | 0.650 | 0.650 |
| Phos. Calcium | 0.020 | 0.020 | 0.020 | 0.020 |
| Lysine-HCl | 0.070 | 0.070 | 0.070 | 0.070 |
| Chinese Herb Mix | 0.010 | 0.010 | 0.010 | 0.010 |
| *Bacillus cereus toyoi* | 0.100 | 0.100 | 0.100 | 0.100 |
| *Bacillus subtillis* | 0.005 | 0.005 | 0.005 | 0.005 |
| Phytase | 0.020 | 0.020 | 0.020 | 0.020 |
| Ethoxyquin | 0.010 | 0.010 | 0.010 | 0.010 |
| Milk Flavor | 0.080 | 0.080 | 0.080 | 0.080 |
| Sweetener | 0.080 | 0.080 | 0.080 | 0.080 |
| Premix | 0.300 | 0.300 | 0.300 | 0.300 |
| Total | 100.000 | 100.000 | 100.000 | 100.000 |

Calculated Nutritional Spec.

| | | | |
|---|---|---|---|
| Protein (%) | 20.207 | Lysine (%) | 1.210 |
| Fat (%) | 5.642 | Methionine (%) | 0.384 |
| M.E. (Kcal/Kg) | 3276.540 | TSAA (%) | 0.758 |
| Calcium (%) | 0.802 | Threonine (%) | 0.848 |
| Phosphorous (%) | 0.568 | Tryptophane | 0.223 |

The pigs were offered ad libitum access to Phase I treatment diets for the 0–14 day period and the Phase II treatment diets for the 14–28 day period. Water was available freely throughout the study.

Pigs were individually weighed on days 0, 7, 14 and 28. Feed disappearance from each pen self-feeder was calculated as the difference between food added and feed weighed for each of the following periods: 0–7 days, 7–14 days, 14–28 days, and 0–28 days. Gain:feed and feed:gain ratios for each period were calculated.

The results are shown in the following table:

| | Growth Performance of Starter Pigs | | | | | |
|---|---|---|---|---|---|---|
| Treatment | | AA–GG | BB–HH | CC–II | DD–JJ | EE–KK | FF–LL |
| Phase-1 | Plasma, % | 0 | 4 | 4 | 2 | 0 | 0 |
| | PeptiGard, % | 0 | 0 | 0 | 2 | 4 | 4 |
| Phase-2 | Plasma, % | 0 | 2 | 0 | 1 | 0 | 0 |
| | PeptiGard, % | 0 | 0 | 0 | 1 | 0 | 2 |

-continued

Growth Performance of Starter Pigs

| Treatment | | AA–GG | BB–HH | CC–II | DD–JJ | EE–KK | FF–LL |
|---|---|---|---|---|---|---|---|
| ADG, g/day | | Kontroll | 4/2% PA RAGRAPH | 4/0% PP | 2/1% PP + 2/ | | |
| Phase-1 | 0–7 days | 295 | 343 | 334 | 336 | 319 | 334 |
| | 7–14 days | 420 | 460 | 456 | 440 | 421 | 449 |
| | 0–14 days | 357 | 401 | 395 | 392 | 370 | 392 |
| Phase-2 | 14–28 days | 581 | 596 | 614 | 596 | 591 | 588 |
| Total | 0–28 days | 472 | 501 | 507 | 499 | 483 | 494 |

The foregoing disclosure sets forth a number of embodiments of the present invention. Other arrangements or embodiments, not precisely set forth, could be practiced under the teachings of the present invention and as set forth in the following claims.

What is claimed is:

1. A process for production of bioactive peptide compositions that enhance the growth of animals and fish which comprises:
   a) treating a fish protein source with an acid;
   b) contacting the resulting acid treated fish protein source with a pepsin enzyme derived from fish;
   c) removing lipids from the pepsin treated acidized fish protein source;
   d) removing solids from the pepsin treated protein source and thereafter;
   e) recovering the resulting bioactive peptide compositions.

2. The process of claim 1 wherein the step of contacting with pepsin enzyme is carried out under conditions effecting the formation of bioactive peptides having aromatic amino acids in N-terminal position.

3. The process of claim 1 wherein step (a) is carried out at a pH in the range of 2–6, a temperature in the range of 10° C. to 60° C. and for a time sufficient to effect formation of bioactive peptides.

4. The process of claim 1 wherein said acid is a mineral or organic acid.

5. The process of claim 4 wherein said mineral acid is selected from the group consisting of hydrochloric, phosphoric and sulphuric acids.

6. The process of claim 4 wherein said acid is an organic acid selected from the group consisting of formic, acetic, propionic and citric acids.

7. The process of claim 1 wherein said pepsin enzyme is obtained from the stomach of cold water fish.

8. The process of claim 7 wherein the cold water fish is selected from fish inhabiting water having a temperature of about 0 to about 15° C.

9. The process of claim 8 wherein the cold water fish is selected from the group consisting of cod, salmon, herring and trout.

10. The process of claim 9 wherein the cold water fish is salmon.

* * * * *